United States Patent [19]
Holeman

[11] 3,907,438
[45] Sept. 23, 1975

[54] CONTOUR MEASURING SYSTEM FOR CYLINDERS

[75] Inventor: John M. Holeman, Schenectady, N.Y.

[73] Assignee: General Electric Company, Schenectady, N.Y.

[22] Filed: June 22, 1973

[21] Appl. No.: 372,768

[52] U.S. Cl. ................. 356/156; 356/167; 356/196
[51] Int. Cl. ............................................ G01b 11/24
[58] Field of Search ........... 356/109, 120, 196, 198, 356/237, 156, 256, 167

[56] References Cited
UNITED STATES PATENTS
2,867,149  1/1959  Goddard ............................. 356/120
3,625,618  12/1971  Bickel ............................... 356/120

Primary Examiner—Ronald L. Wibert
Assistant Examiner—F. L. Evans
Attorney, Agent, or Firm—Daniel R. Levinson; Joseph T. Cohen; Jerome C. Squillaro

[57] ABSTRACT

A contour measuring system is disclosed in which the contour, surface texture and roundness of cylindrical members can be readily determined optically. Specifically, a slit camera converts the cylindrical surface to a planar surface, a picture. The illumination for the picture is provided by thin sheets of light in a plane approximately parallel to the axis of the cylinder and tangential to the surface. The image thus recorded resembles a topographical map of the cylindrical surface.

12 Claims, 8 Drawing Figures

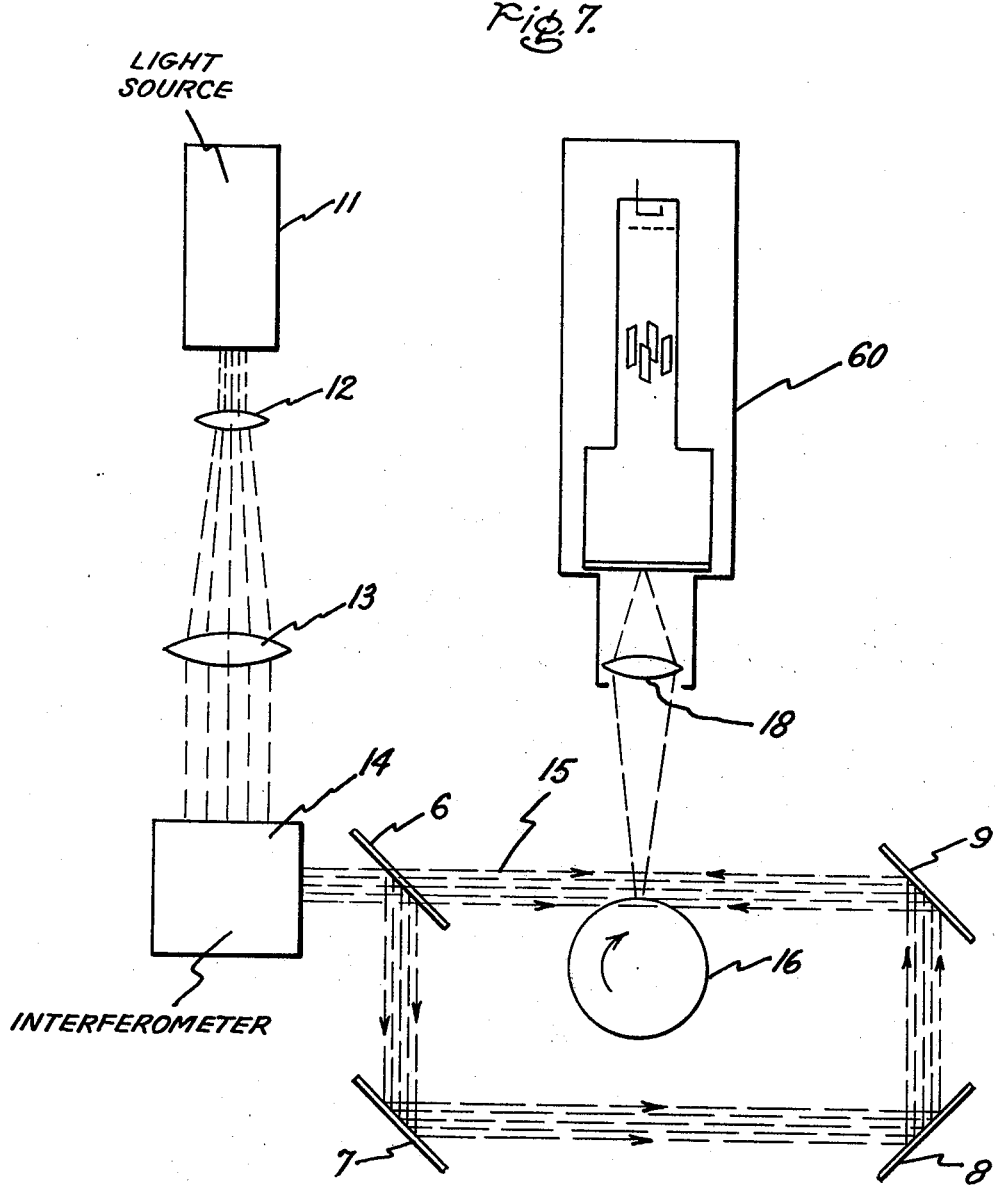

CONTOUR MEASURING SYSTEM FOR CYLINDERS

This invention relates to contour measuring systems and, specifically, to contour measuring systems utilizing optical means.

In a number of arts, a common problem exists in determining the characteristics of a cylindrical member. Such characteristics include contour (hills or valleys on the surface), surface texture (which may be considered contour on a much smaller scale), and roundness (how closely a cross-section follows a true circle or, stated another way, contour on a larger scale relative to the diameter of the cylinder).

Examples of such arts include studies of the corrosion of pipes or rods, buried in the ground for example, and the roundness of bar or pipe stock. Bars and pipes are frequently finished by what is known as a centerless grinder in which the stock is held by three rotating members spaced about the outside of the stock, where one of the rotating members is a grinding wheel. Due to a little known phenomenon, centerless ground material does not have a perfectly circular cross-section. Rather, the cross-section contains lobes, generally three or five, but always an odd number. Measurement of the lobation is difficult since an ordinary micrometer, in measuring the diameter, will span portions of a hill and a valley no matter how positioned.

Prior art attempts at measuring contour, in the broader sense of the word, fall into one of two categories: mechanical and optical. Mechanical measurements include micrometer devices, noted above, and profilometers. A profilometer is a mechanism using a stylus sensor, similar to the pickup cartridge in a record player, resting against the cylinder while the cylinder is turned on its axis. While the sensor is moved in a spiral path along the cylinder, the electrical output signal from the sensor is recorded on a strip chart. Some profilometers obtain a differential output signal by using two sensors, on opposite sides of the cylinder. This type of device suffers from the same deficiency as an ordinary micrometer, as noted above, in measuring lobation.

Optical systems for measuring contour have been used for nominally flat surfaces. One such system utilizes holography to record the surface in a double exposure hologram. As is known, further processing is necessary to create a viewable image. Also, making a hologram is difficult, requiring a very stable environment, which may not be convenient or readily obtainable, special film, and long exposures.

In another optical system, used with nominally flat surfaces, the surface is illuminated through a grating. The straight lines of the shadow of the grating are deformed by the irregularities of the surface. The pattern of deformed lines is viewed through a second grating or through the same grating to produce a moire pattern, which is the desired contour map of the surface.

There are several difficulties with this system. Viewed through a grating, the contour lines are discontinuous and only half of the area is actually seen due to the opaque lines that make up the grating. Also, one or more false moire patterns or "aliases" are produced. Further, the contour interval of the system is determined by the spacings of the lines on the grating, the spacing of which, in turn, is limited by the diffraction of the light passing through the grating. The rulings of the grating are fixed, requiring that the grating be changed when a change in resolution is desired.

The mechanical measurements noted above require direct contact with the cylinder. Further, while perhaps considered a non-destructive test, a profilometer actually impresses a fine groove in the surface of the cylinder thereby destroying the microscopic surface structure of the cylinder, corrosion patterns, for example.

None of these systems is readily usable in hostile environments, e.g., a high temperature, corrosive, or radioactive ambient.

In view of the foregoing, it is therefore an object of the present invention to provide an improved contour measuring system.

Another object of the present invention is to provide an optical contour measuring system for cylindrical surfaces.

A further object of the present invention is to provide a contour measuring system for cylindrical surfaces that does not contact the surface.

Another object of the present invention is to provide a contour measuring system one form of which is operable in hostile environments.

A further object of the present invention is to provide a contour measuring system in which the depth resolution or contour interval can be adjusted to suit the nature of the surface under investigation.

The foregoing objects are achieved in the present invention wherein, the one embodiment of the present invention, a slit camera converts the cylindrical surface to a planar surface. The cylindrical surface is illuminated with thin, parallel sheets of light. The resultant image or picture resembles a topographic map of the surface. The sheets of light are generated by any of several devices, generically described as gratings and interferometers; grating being used for coarser measurements and interferometers being used for fine measurements.

In an alternative embodiment a television camera is used in combination with light sheet illumination to provide a line deformation contour map.

A more complete understanding of the present invention can be obtained by considering the following detailed description in conjunction with the accompanying drawings, in which:

FIG. 7 illustrates an alternative embodiment of the present invention utilizing a television camera.

Figure 1:
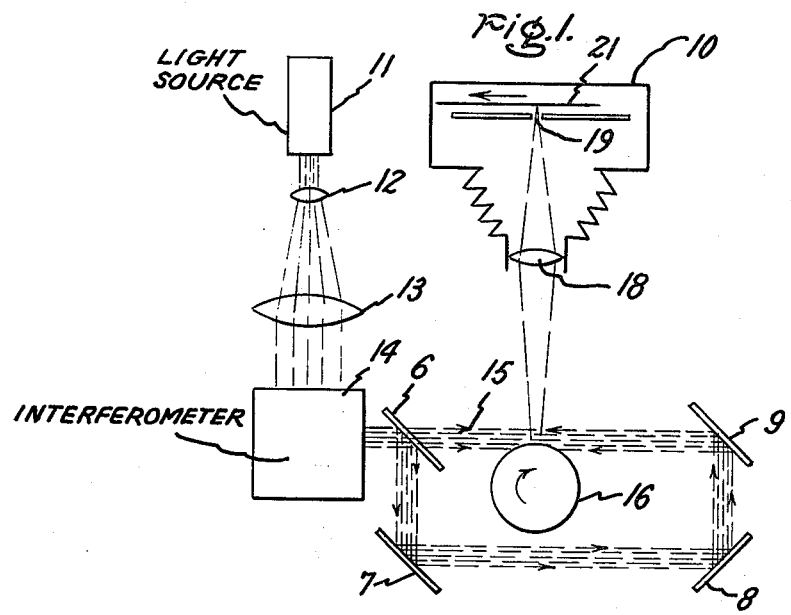
FIG. 1 illustrates a preferred embodiment of the present invention.

The contour measuring system in accordance with a preferred embodiment of the present invention is illustrated in FIG. 1 and comprises a coherent light source 11 having the output beam thereof spread by lens 12 and collimated by lens 13 to form a parallel light beam. Light source 11 may, for example, comprise a laser. Interferometer 14 converts the collimated light into parallel sheets of light 15 that are used to illuminate the cylindrical surface represented by cylinder 16, which may be turned by any suitable means, such as a synchronous motor. A narrow slit portion of the surface of cylinder 16, tangential to beam 15, is photographed by way of lens 18, slit 19, and photosensitive surface 21, which may, for example, comprise photographic film. Elements 18, 19 and 21 comprise slit camera 10, known per se in the art, in which the film moves in synchronism with the image so that a clear recording is obtained.

Figure 2:
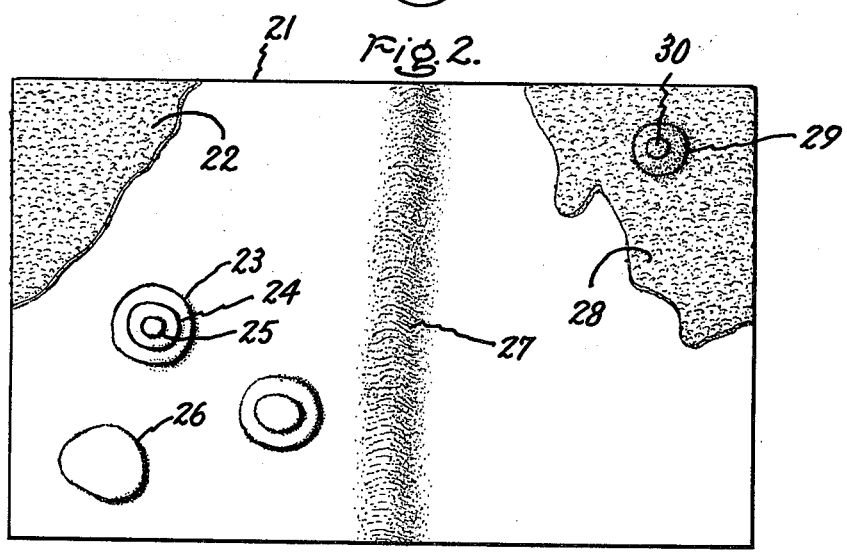
FIG. 2 illustrates an image produced by the contour measuring system of the present invention.

The overall operation of the present invention may best be understood by considering FIG. 2 in conjunction with the description of the operation of FIG. 1.

The parallel sheets of light from interferometer 14 illuminate the surface of cylinder 16 and, in particular, intercept the surface of cylinder 16 at a tangent. The alternate light and dark bands are incident upon the surface of cylinder 16 so that, for a perfectly round cylinder having a smooth surface, the narrow slit viewed by slit camera 10 would appear to have uniform shading. Any protrusion, out of roundness, or surface texture intercepts a different portion of the light and dark bands and changes shade. As slit camera 10 scans the cylinder, recording medium 21 records, in effect, a plurality of narrow slits laid edge to edge. The resultant image is a contour, topographical map of the surface.

Depending upon the positioning of cylinder 16, the background can be made to have any desired shade varying from white through black by moving cylinder 16 among the alternate light and dark bands from interferometer 14. Typically, the background is adjusted to a medium gray.

FIG. 2 represents a photograph of a cylindrical surface made in accordance with the present invention. For the sake of illustration, the background is shown as white, thus any change in topography produces a darkening of the image. It should also be noted that FIG. 2 illustrates a possible, although unlikely, combination of topographic features since it is representative of a number of different types of contours that can be measured and recorded by the present invention. The different types of contours (roundness, hills and valleys, and texture) generally require different light sheet spacings to be observed and would not normally be seen simultaneously.

Area 22 represents the image produced by corrosion on the surface of cylinder 16. Depending upon the spacing of the light sheets, corrosion 22 appears as a darker, granular plateau on the surface of cylinder 16. Protrusions on the surface of cylinder 16 intercept one or more of the light sheets and produce a series of rings similar to that utilized in a topographic map to illustrate a hill.

Specifically, fringes 23, 24, and 25 designate a protrusion at that point having a height that can be measured by counting the number of fringes and knowing the spacing thereof. The protrusion illustrated by a single fringe 26 is approximately one-third the height of the protrusion illustrated by fringes 23–25. Utilizing a medium gray background, broad, low protrusions such as illustrated by fringe 26 can be made to stand out very distinctly since the area within the fringe generally will not have same gray tone as the background.

Shaded area 27 represents an out of roundness extending the entire length of the cylindrical section being photographed. Due to the out of roundness of the cylinder, region 27 intercepts a different portion of the light and dark sheets from source 14 so that a different tone is produced against the background of the reference surface of cylinder 16. Shaded area 28 illustrates another area of corrosion which would join with area 22 if the flat image were curved to form a cylinder.

As previously noted, the spacing of the light sheets determines the number of fringes produced by a change in the topography of the surface of cylinder 16. Depending upon what one desires to study, the spacing of the light sheets may be on the order of the surface roughness of cylinder 16. When this occurs the fringes, such as fringes 29 and 31, become granular in appearance and start to blend into the background. If the spacing between the light sheets were expanded so that the spacing is no longer on the order of the surface roughness of the cylinder, then fringes 29 and 31 would disappear and be replaced perhaps by only a single fringe since the height of the protrusion causing these fringes has not changed but the distance between the light sheets has changed.

FIG. 2 illustrates the image produced by illuminating both sides of cylinder 16. This can be done very simply with the apparatus of FIG. 1 by adding beam splitter 6 and mirrors 7–9 to split beam 15 and reorient it so that both sides of the protrusions on cylinder 16 are illuminated. Were this not done, the image recorded on photosensitive material 21 would have pronounced shadows to the right or left, depending upon the direction of the illumination.

In order to produce an image such as illustrated in FIG. 2, the present invention utilizes the combination of two optical effects. The first is the tangential illumination of the surface of cylinder 16 with sheets of light to produce a variation in illumination depending upon the topography of the surface. The second is the rotation of cylinder 16 in synchronism with the movement of photorecording medium 21 so that cylinder 16 is in effect flattened out into a plane image. By this combination, utilizing light sheet illumination from one or both sides, clear images, shown as variations in tone from light to dark, illustrate the nature of the surface of a cylinder. Depending upon the spacing of the light sheets, the surface texture of cylinder 16, the contour of cylinder 16, or the roundness of cylinder 16, in order of increasing spacing respectively are obtained.

As an example, the following table represents the range of contour spacings for different types of contours. It is understood that the ranges are approximate and depend to a large extent on the condition of the cylinder; for example, the interval for roundness depends upon how badly out of round the cylinder is.

Table A

| Contour | Contour Interval |
|---|---|
| roundness | 100 – 0.1 mils |
| topography (hills/valleys) | 10 – 1.0 mils |
| surface texture | 5 – 0.1 mils |

Figure 3:
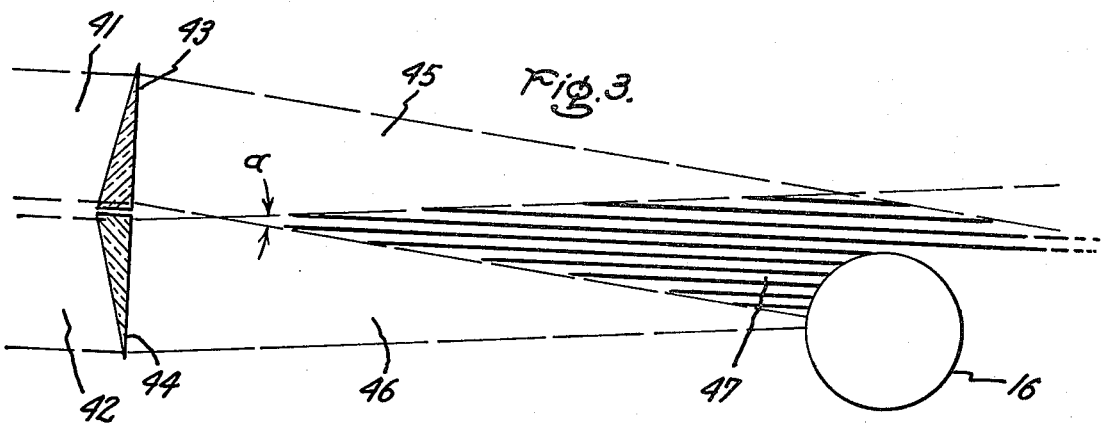
FIG. 3 illustrates one device for producing light sheets in accordance with the present invention.

The parallel light sheets provided by interferometer 14 may be generated in a number of devices, generically described as interferometers. One such interferometer is illustrated in FIG. 3 wherein collimated light beams 41 and 42 pass through a pair of wedge prisms, 43 and 44 respectively, having their bases facing one another to produce intersecting light beams 45 and 46 respectively. In the region of intersection 47, interference fringes are produced that provide alternate light and dark sheets for illuminating cylinder 16.

The contour interval, i.e. the spacing between light sheets, is determined by the wavelength of the light and the shear angle at which the beams intersect. Specifically, the contour interval equals $$\frac{\lambda}{2 \sin \frac{\alpha}{2}}$$

where $\lambda$ is the wavelength of the light and $\alpha$ is the shear angle. Prisms such as prisms 43 and 44 are described by their "deviation angle". In the following table, different prism deviation angles are listed with the corresponding contour interval produced.

Table B

| Prism deviation (angle) | Contour Interval (mils) |
| --- | --- |
| 1°08' | 0.5 |
| 52' | 1.0 |
| 34' | 1.5 |
| 17' | 2.8 |
| 8' | 4.0 |

The use of wedge prisms to provide the interference fringes constitutes a relatively rugged system, tolerant of shock or vibration. Alignment of the prisms is relatively simple and the prisms may conveniently have their thick bases fastened together. Also, wedge prisms induce very little light loss in the system so that the light available from the source is used relatively efficiently in illuminating the cylinder as a series of light sheets.

Wedge prisms however are fixed in the shear angle provided for the light beams. Thus the contour interval is fixed depending upon the choice of deviation angle of the prism. Where an adjustable contour interval is desired, it is necessary to use another form of interferometer. One suitable interferometer is illustrated in FIG. 4.

Figure 4:
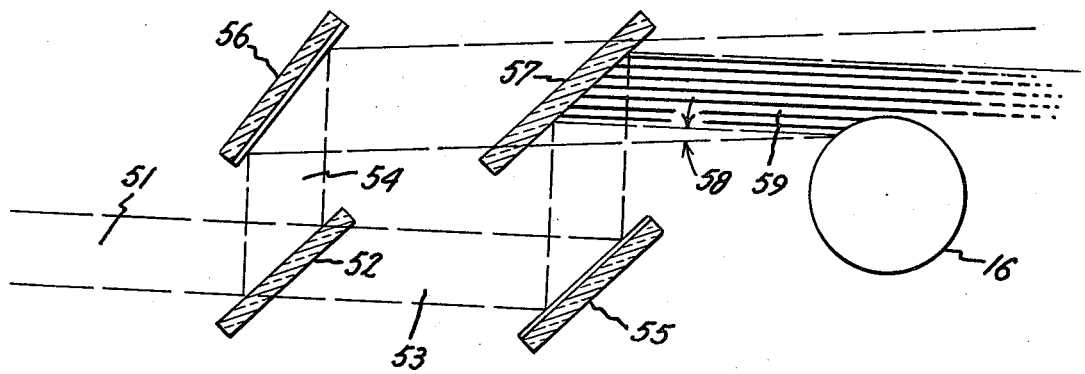
FIG. 4 illustrates another device for producing light sheets in accordance with the present invention.

FIG. 4 illustrates schematically what is known as a Mach-Zehnder interferometer comprising a beam splitter 52 for splitting an incoming beam 51 into two orthogonal components 53 and 54. Beam 53 is reflected by front surface mirror 55 along a path perpendicular to beam path 51. Beam 54 is reflected by front surface mirror 56 along a beam path parallel to original beam path 51. The re-oriented beam paths 53 and 54 are combined in beam splitter 57 to produce an output beam from the interferometer.

The sheets of light are produced by the misalignment of one of the front surface mirrors, for example, mirror 56. Thus the reflection of beam 54 is not along a path exactly parallel to original beam path 51 and the reflected portion of beam 54 intersects the reflected portion of beam 53 at a shear angle designated as 58. In the region of overlap 59, interference fringes are produced that provide the parallel light and dark bands for illuminating cylinder 16.

As noted above, the contour interval is determined by both the wavelength of the light and the shear angle at which the beams intersect. For an interferometer as described above, the following table represents the contour intervals obtained at a number of shear angles using light having a wavelength of 6328A (red light).

Table C

| Shear Angle | Contour Interval (mils) |
| --- | --- |
| 3° | .5 |
| 2° | .72 |
| 1° | 1.5 |
| 30' | 2.8 |
| 20' | 4.0 |
| 10' | 8.7 |
| 6' | 16.0 |

A Mach-Zehnder interferometer, while providing an adjustable contour interval, introduces some light loss due to beam splitters 52 and 57 and mirrors 55 and 56. Further, the alignment, or the precise misalignment, of the interferometer is not as mechanically stable as two wedge prisms cemented together. However, an adjustable contour interval is provided that is extremely useful in studying the various types of contour of a given sample without partially dismantling the optical system to change the contour interval.

While described above as utilizing a Mach-Zehnder interferometer, other suitable interferometers can be utilized to provide the parallel sheets of light. For example, the Twyman-Green interferometer also provides suitable light sheets.

Figure 5:
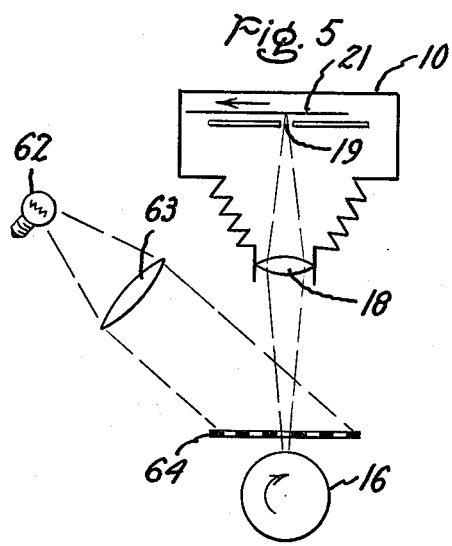
FIG. 5 illustrates an alternative embodiment of the present invention.

In an alternate embodiment of the present invention, the parallel light sheets are provided by a collimated light source and a grating. Specifically, in FIG. 5, light from source 62, such as an incandescent or arc lamp, is collimated by lens 63 and projected through grating 64 onto cylinder 16. Grating 64 is preferably parallel to the tangent to cylinder 16, while the collimated light from source 63 is preferable at 45° to grating 64. Slit camera 10, comprising elements 18, 19, and 21, records the image of cylinder 16 through grating 64 as moire pattern of contour lines.

Figure 6:
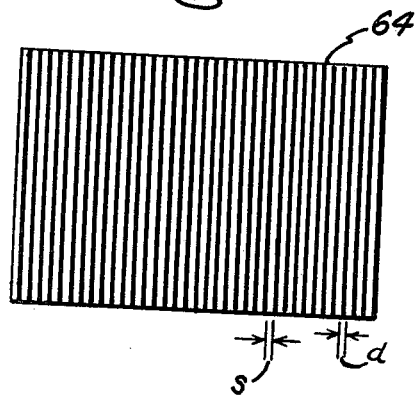
FIG. 6 illustrates another device for producing light sheets in accordance with the present invention.

One example of a suitable grating is illustrated in FIG. 6. Grating 64 comprises a plurality of opaque rulings having a width, $d$, and space one from the other by a distance $s$, where $s = d$. This grating, known in the art as a Ronchi grating, when used with collimating optics 63, provides a plurality of parallel sheets of light having a spacing of from 50 to 500 sheets per inch, when commercially available gratings are utilized. Special custom gratings may be utilized to provide other spacings of parallel light sheets. This however generally applies only in the coarser line spacing rather than in the finer line spacing. Due to diffraction problems, gratings finer than about 500 lines per inch tend to produce indistinct contour lines that are not readily measured.

The contour interval, that is, the height represented by the variation from one contour to the next, is equal to $s \cdot \cos \phi$, where $s$ is the grating line spacing and $\phi$ is the angle of incidence of the light sheets. For the special case of $\phi = 45°$, the contour interval is the same as the line spacing. Thus a grating having 50 lines per inch provides a contour interval of 0.02 inches. For resolution finer than 0.002 inches (as obtained from a 500 line per inch grating), a different source of parallel sheets of light must be used; for example, the interferometers described above.

Figure 8:
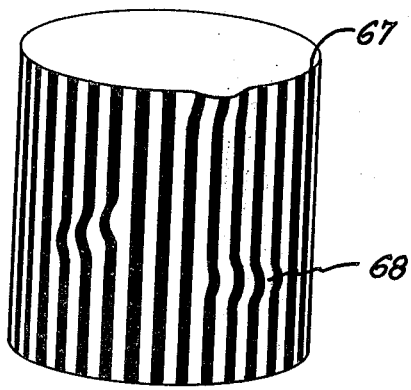
FIG. 8 illustrates a view of a perfectly cylindrical body as seen by a television camera.

Depending upon whether a permanent record and an accurate measurement of the contour of a cylindrical body are desired, or simply an inspection of a cylindrical body for a particular aspect of contour, a non-recording camera may be substituted for slit camera 10. For example, where it is desired to simply inspect the cylindrical members, a television camera 60 can be substituted for slit camera 10, as illustrated in FIG. 7. As can be seen, FIG. 7 is the same as FIG. 1, except for camera 60, and like elements bear the same reference number. With a television camera, the surface of the cylinder is not, in effect, flattened since there is relative motion between the camera target and the surface of the cylinder. The image produced by television camera 60 looking at a cylindrical surface illuminated with light sheets from both sides, would appear similar to the illustration of FIG. 8 wherein cylinder 67 contains a plurality of vertical stripes caused by the intersection of a plurality of light sheets with the surface. Near the central portion of cylinder 67, where the light sheets are approximately tangential to the surface, there is a broadening of the area illuminated by a light sheet as well as a broadening of the dark bands between the light sheets. Conversely, near the edges of cylinder 67, the light and dark bands appear closer together due to the roundness of cylinder 67.

The surface of cylinder 67 is readily inspected by selection of a suitable contour interval and monitoring the cylinder as it is rotated about its axis. The measurement, if desired, of contour is accurate at the tangential region. Any change in the contour of cylinder 67 produces a deformation of the normally straight lines, such as designated by reference numeral 68, producing an overall effect reminiscent of the variation in grain around a knothole in a piece of wood. These variations are easily seen and may be accurately measured as the deformation is moved to the tangential illumination area.

The present invention thus provides a contour measuring system for cylindrical surfaces that does not require contact with the cylindrical surface while at the same time provides an accurate measurement of the various types of contours that one may wish to study, e.g. out of roundness, hills and valleys in the surface, and the surface texture. The apparatus of the present invention can function in a far less mechanically stable environment than required by holographic methods and, further, is suitable for use in hostile environments. As a specific example, the present invention may be utilized in the inspection of fuel rods for a nuclear reactor.

The fule rods for a nuclear reactor generally comprise a metallic, neutron transparent cylinder containing the uranium fuel. A plurality of these rods are bundled together and immersed in a water ambient where, depending upon their proximity one to the other, the uranium undergoes controlled fission to produce heat that is transferred to the water, converting it to steam.

Fuel rods, however, may be subject to failures in which the cylindrical container cracks, allowing radioactive material to enter into the water. In order to prevent this contamination, it is necessary to periodically close down the reactor and inspect each bundle of fuel rods for signs of rupture or surface deformation.

The inspection of the fuel rods is complicated by the fact that they are "hot" both in the radioactive sense and in the temperature sense. Having started to react, the uranium fuel continues to produce heat for extended periods of time even after one fuel rod has been separated from the others. To prevent damage and overheating of the fuel rods, it is necessary to maintain them immersed in water, which acts to remove heat and absorb radioactivity.

The present invention, when the camera and optical systems are suitably shielded, is capable of inspecting the fuel rods in the hot condition under water. Thus it is not necessary to wait until the fuel rods have cooled sufficiently to be safe to handle out of a cooling ambient.

For quantitative measurement, photosensitive recording means 21 is suitably protected from fogging by radiation absorbing material such as metal or leaded glass. For qualitative inspection, i.e. whether or not there is a deformation, regardless of size, remote sensing by way of a television camera as described above can be utilized. For permanent records, photographs may be taken of the monitor.

Conventional television cameras, particularly the electronic circuitry contained therein, are subject to early failure in radioactive environments. However, known radioactive "hard" electronic circuits are available and can be used in the camera, as is done for space exploration. These circuits, when substituted in the television camera, substantially increase the life of the camera so that it can withstand several years of exposure to radioactivity at the level existing when inspecting these rods through two feet or more of water.

Having thus described the invention, it will be apparent to those of skill in the art that various modifications can be made within the spirit and scope of the present invention. For example, the cylinder under inspection need not be metallic. Further, the cylinder under inspection need not be a closed cylinder but merely a section of cylinder suitably mounted to rotate about the axis of the cylindrical surface to be inspected. Also, while described as parallel, the light sheets can be adjusted so that they are slightly out of parallel with the axis of the cylinder to give a sense of whether one is viewing a hill or a valley, particularly where a slit camera is not used.

What I claim as new and desire to secure by Letters Patent of the United States is:

1. A contour measuring system for cylindrical surfaces comprising:
    a source of a plurality of parallel sheets of collimated light;
    a cylindrical surface having the axis thereof approximately parallel to the plane of said sheets, said cylindrical surface positioned so that said light sheets have a non-zero angle of incidence with respect to said surface; and
    slit camera means for recording the contour of said surface at the intersection of said light sheets and said surface.

2. The contour measuring system as set forth in claim 1 wherein said light sheet producing means comprises a grating.

3. The contour measuring system as set forth in claim 1 wherein said light source comprises:
    laser means producing a beam of coherent light;
    beam spreading means for enlarging the diameter of said laser beam;
    collimating means for producing a beam of parallel light; and
    light sheet producing means for converting said beam of parallel light into a plurality of light sheets.

4. The contour measuring system as set forth in claim 3 wherein said light sheet producing means comprises an interferometer.

5. The contour measuring system as set forth in claim 4 wherein said source of parallel sheets of light includes beam splitting and reorienting means for tangentially illuminating both sides of said cylindrical surface.

6. The contour measuring system as set forth in claim 1 wherein said slit camera means includes photographic film as the recording medium.

7. A contour measuring system for cylindrical members comprising:
   a source of a plurality of parallel sheets of collimated light;
   a cylindrical surface having the axis thereof parallel to the plane of said sheets, said cylindrical surface positioned so that said light sheets fall tangentially on said surface; and
   camera means for recording the contour of said surface as a plurality of deformed lines, the deformation of which is determined by the contour of said cylindrical surface, said camera positioned approximately radially with respect to said axis for viewing the surface upon which said light sheets are incident.

8. The contour measuring system as set forth in claim 6 wherein said source of parallel sheets of light includes beam splitting and reorienting means for tangentially illuminating both sides of said cylindrical surface.

9. The contour measuring system as set forth in claim 6 wherein said camera means comprises a television camera.

10. The method of measuring surface features of a cylindrical surface comprising the steps of:
    illuminating said surface with a plurality of spaced, parallel sheets of light incident upon said surface at a non-zero angle of incidence;
    recording the image of said surface as a plurality of topographical contours;
    determining the dimensions of said features by the number and shape of said topographical contours.

11. The method as set forth in claim 10 wherein said illuminating step comprises:
    generating a beam of coherent light;
    splitting said beam of coherent light into two beams;
    shearing said two beams to produce interference fringes; and
    intercepting said fringes with said cylindrical surface.

12. The method as set forth in claim 10 wherein said recording step comprises:
    viewing said surface with a television camera to produce a video image;
    transmitting said video image to a remote location;
    displaying said video image on a monitor; and
    recording the display on said monitor on photographic film.

* * * * *